United States Patent [19]
Yada et al.

[11] Patent Number: 4,590,895
[45] Date of Patent: May 27, 1986

[54] INTAKE PASSAGE FOR INTERNAL COMBUSTION ENGINE

[75] Inventors: Yoshikuni Yada; Syunki Okazaki, both of Hiroshima, Japan

[73] Assignee: Mazda Motor Corporation, Hiroshima, Japan

[21] Appl. No.: 591,458

[22] Filed: Mar. 20, 1984

[30] Foreign Application Priority Data

Mar. 22, 1983 [JP] Japan .................................. 58-48344

[51] Int. Cl.[4] ............................................. F02B 75/13
[52] U.S. Cl. ................................ 123/52 MB; 123/393
[58] Field of Search ................ 123/52 M, 52 MB, 393

[56] References Cited

U.S. PATENT DOCUMENTS

| | | | |
|---|---|---|---|
| 2,835,235 | 5/1958 | Gassmann | 123/52 M |
| 3,177,854 | 4/1965 | Garcea | 123/52 M |
| 3,557,898 | 1/1971 | Emery et al. | 123/393 |
| 4,446,823 | 5/1984 | Bessmo | 123/52 MB |

FOREIGN PATENT DOCUMENTS 2117447 10/1983 United Kingdom ............. 123/52 M

*Primary Examiner*—Craig R. Feinberg
*Attorney, Agent, or Firm*—Murray, Whisenhunt and Ferguson

[57] ABSTRACT

A part of intake passages is made into an arcuate form extending around a surge tank. A rotatable drum is provided in the surge tank to change the length of the arcuate part of the passages. The rotatable drum is controlled by a control mechanism which is operated in accordance with the engine speed for example, so that the effective length of the intake passages may be changed to keep synchronization between the natural frequency of the intake system and the frequency of the pressure wave caused by the reciprocal motion of the piston of the engine.

9 Claims, 5 Drawing Figures

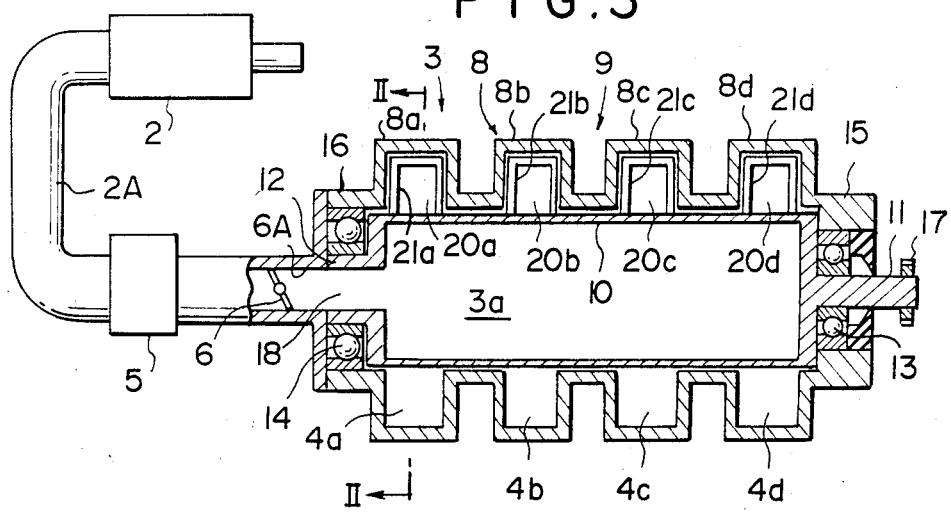
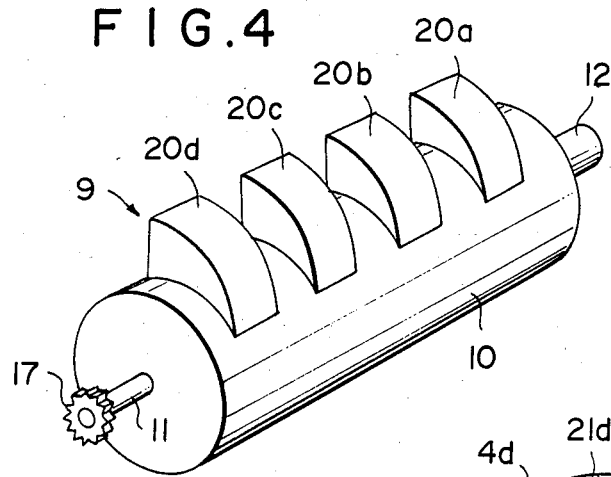
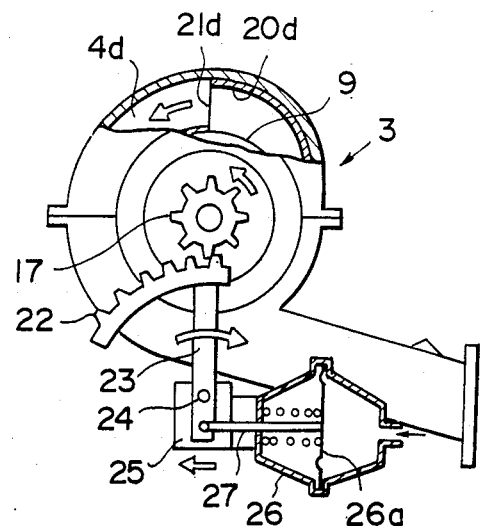

INTAKE PASSAGE FOR INTERNAL COMBUSTION ENGINE

BACKGROUND OF THE INVENTION

1. Field of the Invention

This invention relates to an intake passage for an internal combustion engine the length of which is made variable according to the condition of the engine, and more particularly to an intake passage for an internal combustion engine in which the length of the intake passage is varied so as to enhance the output power of the engine by making the natural frequency of the intake system synchronized with the frequency of the pressure change caused by the reciprocal motion of the piston in the cylinder.

2. Description of the Prior Art

In the internal combustion engine, as the piston moves up and down in the cylinder, a pressure wave is created in the intake passage and transmits through the intake passage up to the surge tank, where it is reflected and then returns to the cylinder. This is repeated and accordingly results in a periodical pressure change in the intake passage at a frequency determined by the condition of the engine such as the engine speed. On the other hand, every intake system of the engine has its natural frequency determined by the volume of the intake passage and the cylinder. It is known that the output power of the engine can be enhanced by making the above mentioned both frequencies synchronized with each other.

In order to obtain a high output power of the engine over a wide range of engine speed, it is known to make the length of the intake passage variable according to the engine speed. This type of the intake passage is disclosed for instance in Japanese Unexamined Utility Model Publication No. 56(1981)-2023 and No. 57(1982)-22629.

These known intake passages, however, have drawbacks that they require a large space in the engine room because the length of these intake passages is made variable in the lengthwise direction. Further, these intake passages need comparatively complicated and large equipments for varying or changing the length of the intake passages.

SUMMARY OF THE INVENTION

The principal object of the present invention is, accordingly, to provide an intake passage for an internal combustion engine capable of varying its length according to the condition of the engine which is compact in size.

A more specific object of the present invention is to provide an intake passage for an engine capable of varying its length which employs a passage length control means made of a small number of elements and accordingly is simple in structure.

The intake passage in accordance with the present invention is characterized in that a part of the intake passage is made into an arcuate form around the surge tank and the effective length of the intake passage is varied by rotating a passage length control member rotatably mounted to the surge tank along said arcuate-formed part of the intake passage.

Since a part of the intake passage is made into an arcuate form around the surge tank, the size of the intake passage is not substantially enlarged. Further, since a passage length control member is made rotatable along the arcuate part of the intake passage around the surge tank, the number of elements constituting the variable length intake passage can be made small and the structure thereof can be made simple. Hence, a compact and simple structured intake passage that is capable of varying its length can be provided.

BRIEF DESCRIPTION OF THE DRAWINGS

FIG. 3 is a cross-sectional view taken along the line III—III of FIG. 2, FIG. 4 is a perspective view showing an intake passage length control member employed in the embodiment shown in FIGS. 2 and 3, and FIG. 5 is a partly sectioned side view of the surge tank provided with the intake passage in accordance with the embodiment of the present invention as shown in FIGS. 2 to 4, which particularly shows means for controlling the length of the intake passage.

DESCRIPTION OF THE PREFERRED EMBODIMENT

Figure 1:
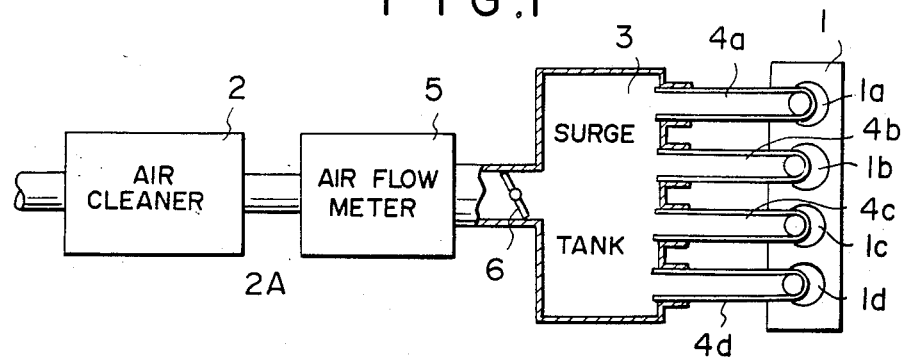
FIG. 1 is a block diagram showing an air intake system for an internal combustion engine to which the intake passage in accordance with the present invention is applied.

Now the present invention will be described in detail with reference to a preferred embodiment thereof referring to the accompanying drawings. FIG. 1 generally shows the intake system in which the intake passage in accordance with the present invention is employed.

Referring to FIG. 1, the intake air is introduced into the engine 1, four cylinder engine in this embodiment, by way of a common intake passage 2A including an air cleaner 2, a surge tank 3 and independent intake passages 4a, 4b, 4c and 4d. The independent intake passages 4a, 4b, 4c and 4d are connected to cylinders 1a, 1b, 1c and 1d, respectively. In the embodiment shown in FIG. 1, an air flow meter 5 is provided in the common intake passage 2A between the air cleaner 2 and the surge tank 3, and a throttle valve 6 is provided between the air flow meter 5 and the surge tank 3. As more explicitly shown in FIG. 2, a fuel injection nozzle 7 is provided on each of the intake passages 4a to 4d.

Figure 2:
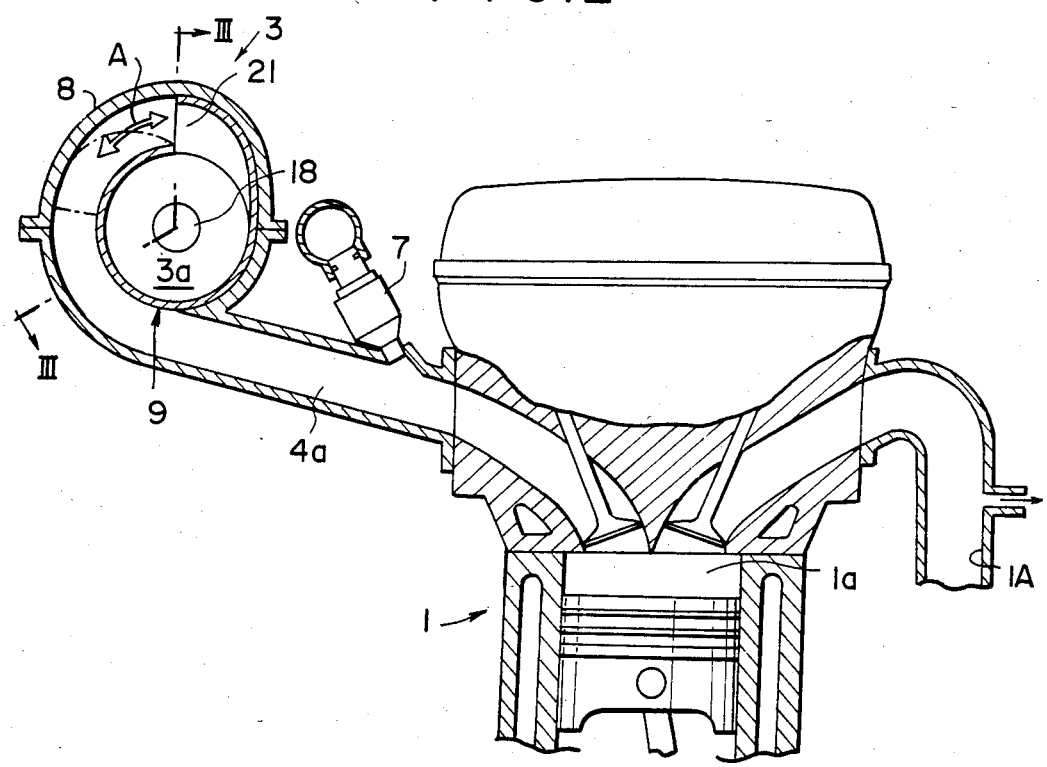
FIG. 2 is a vertical partial cross-sectional view showing an intake passage connected to an engine in accordance with an embodiment of the present invention.

The structure of the intake passages 4a to 4d the length of which are made variable according to this invention will be described in detail hereinbelow referring to FIGS. 2 to 5. In FIG. 2, one of the intake passages 4a is illustrated and the description will be made with reference to this intake passage 4a only.

Referring to FIG. 3, the surge tank 3 is provided with a rotatable sub-tank or passage length control member 9 (hereinafter referred to as "control drum") in a casing 8. The control drum 9, as best shown in FIG. 4, has a cylindrical body 10 defining an internal space 3a communicated with the common intake passage 2A upstream the serge tank 3 and is provided at opposite ends with axle portions 11 and 12, one of which 11 has thereon a pinion 17 meshed with a control sector gear 22 described hereinafter. The cylindrical body 10 has on its periphery four expanded parts 20a, 20b, 20c and 20d having open ends 21a, 21b, 21c and 21d, respectively. The casing 8 of the surge tank 3 has four expanded sections 8a, 8b, 8c and 8d communicated with intake passages 4a, 4b, 4c and 4d, respectively, and slidably engaged with said expanded parts 20a, 20b, 20c and 20d of the cylindrical body 10 of the control drum 9.

The casing 8 further has support ends 15 and 16 which rotatably support said axle portions 11 and 12 of the control drum 9 by means of bearings 13 and 14 provided therein. The control drum 9 has an open end 18 at one of said axle portions 12, which is communicated with the throttle chamber 6A enclosing said throttle valve 6 in the common intake passage 2A.

Hence, the internal space 3a of the control drum 9 forms a substantial part of the surge tank 3 and connects the throttle chamber 6A of the common intake passage 2A with the intake passages 4a to 4d. The expanded parts 20a to 20d are communicated with the intake passages 4a to 4d by way of the expanded sections 8a to 8d of the casing 8. By rotating the control drum 9 as shown by an arrow A about said axle portions 11 and 12 up to the position shown by chain line in FIG. 2, the effective length of the intake passages 4a to 4d is varied.

As shown in FIG. 5, the pinion 17 fixed at the axle portion 11 of the control drum 9 is engaged with a control sector gear 22 secured to an end of a lever 23 which is swingable about a pivot 24 provided on a support member 25. The other end of the lever 23 is connected with an end of a control rod 27 which in turn is connected at the other end thereof with a diaphragm member 26a of a diaphragm 26, which is communicated with a part of an exhaust passage 1A (FIG. 2) of the engine 1.

Since the diaphragm 26 is connected with the exhaust passage 1A of the engine 1, the pressure sensed by the diaphragm 26 is increased when the engine speed is increased. That is, as the engine speed changes, the pressure sensed by the diaphragm 26 changes and the control rod 27 is moved back and forth to swing the lever 23 about said pivot 24. Hence, as the engine speed increases, the lever 23 is swung clockwise in FIG. 5 and the pinion 17 is rotated counterclockwise, to rotate the control drum 9 counterclockwise which results in shortening of the intake passage 4d. By shortening the length of the intake passage 4d, the natural frequency of the intake system is synchronized with the frequency of the pressure wave caused by the reciprocal motion of the piston in the engine when the engine speed is increased. When the engine speed is lowered, the exhaust pressure sensed by the diaphragm 26 falls and the lever 23 is swung counterclockwise to rotate the pinion 17 and accordingly the control drum 9 clockwise, whereby the intake passage 4d is elongated or recovered to its original length to keep synchronization of the natural frequency of the intake system with the pressure wave resulting from the reciprocal motion of the piston.

What is claimed is:

1. A variable length intake passage for an internal combusion engine having at least one cylinder, said variable length intake passage extending between a common intake passage and said at least one cylinder, said variable length intake passage comprising:
    a first tank member having an axis, said first tank member having an inlet and at least one outlet, said inlet of said first tank member connected to said common intake passage, each said outlet of said first tank member corresponding to a respective engine cylinder and connected to said respective engine cylinder, each said outlet comprising a radially expanded portion of said first tank disposed transverse to said axis and defining an arcuate fluid flow conduit of predetermined length;
    a second tank member having an axis, said second tank member being rotatable about said axis, said second tank member coaxially enclosed within and completely surrounded by said first tank member for rotation relative to said first tank member, said second tank member having an inlet and at least one outlet, said inlet of second tank member connected to said inlet of said first tank member, each said outlet of said second tank member corresponding to a respective outlet of said first tank member, each said outlet of said second tank formed as a radially expanded portion of said second tank disposed transverse to said axis and defining an arcuate fluid flow conduit of predetermined length, said outlet of said second tank being of a length less than said outlet of said first tank, said outlet of said second tank being slidably received within said expanded portion of said outlet of said first tank; and
    rotation means for rotating said second tank about said axis relative to said first tank, whereby rotation of said second tank member relative to said first tank member varies the length of said intake passage from said common intake passage to said cylinder.

2. The variable length intake passage according to claim 1, wherein a throttle chamber is provided in said common intake passage.

3. The variable length intake passage according to claim 2, wherein said throttle chamber is directly connected to said inlet of said first tank.

4. The variable length intake passage according to claim 2, wherein an intake airflow metering means is provided upstream of said throttle chamber.

5. The variable length intake passage according to claim 1, further comprising control means for controlling said rotation means to control the degree of rotation of said second tank member relative to said first tank member in response to an operating condition of the internal combustion engine.

6. The variable length intake passage according to claim 5, wherein said control means controls the degree of rotation of said second tank member in response to engine speed.

7. The variable length intake passage according to claim 6, wherein said control means comprises an engine speed sensor and means for controlling the degree of rotation of said second tank member relative to said first tank member in response to the output of the engine speed sensor.

8. The variable length intake passage according to claim 7, wherein said engine speed sensor is a diaphragm communicated with an exhaust passage of said engine.

9. The variable length intake passage according to claim 8, wherein said diaphragm is connected with a swingable lever to swing the lever according to the pressure in the exhaust passage sensed by the diaphragm, and the lever is provided with a drive means for rotating said second tank member relative to said first tank member.

* * * * *